Aug. 10, 1954

R. R. FEESER 2,685,995

BAGGING MACHINE

Filed Dec. 4, 1950

INVENTOR.
ROY R. FEESER

BY
DES JARDINS, ROBINSON & KEISER

Howard S Keiser

HIS ATTORNEYS

Aug. 10, 1954

R. R. FEESER 2,685,995

BAGGING MACHINE

Filed Dec. 4, 1950

INVENTOR.
ROY R. FEESER

BY DES JARDINS, ROBINSON & KEISER

Howard G Keiser
HIS ATTORNEYS

Aug. 10, 1954   R. R. FEESER   2,685,995
BAGGING MACHINE

Filed Dec. 4, 1950   7 Sheets-Sheet 3

INVENTOR.
ROY R. FEESER

BY
DES JARDINS, ROBINSON & KEISER

HIS ATTORNEY

Aug. 10, 1954  R. R. FEESER  2,685,995
BAGGING MACHINE
Filed Dec. 4, 1950  7 Sheets-Sheet 5

INVENTOR.
ROY R. FEESER
BY
DES JARDINS, ROBINSON & KEISER
Howard T. Keiser
HIS ATTORNEYS Aug. 10, 1954

R. R. FEESER 2,685,995

BAGGING MACHINE

Filed Dec. 4, 1950

*INVENTOR.*
ROY R. FEESER

BY
DES JARDINS, ROBINSON & KEISER

*Howard F Keiser*

HIS ATTORNEYS

Aug. 10, 1954  R. R. FEESER  2,685,995
BAGGING MACHINE
Filed Dec. 4, 1950  7 Sheets-Sheet 7

Fig. 14

INVENTOR.
ROY R. FEESER
BY
DES JARDINS, ROBINSON & KEISER

HIS ATTORNEYS

Patented Aug. 10, 1954

2,685,995

UNITED STATES PATENT OFFICE 2,685,995

BAGGING MACHINE

Roy Ralph Feeser, Thomasville, Pa.

Application December 4, 1950, Serial No. 199,036

13 Claims. (Cl. 226—18)

This invention relates to a machine for automatically packing articles in cellophane bags and, more particularly to a machine in which the articles to be packaged are loaded by hand into a series of trays which are moved seriatim into a bag filling position where the articles are automatically bagged and delivered to a conveyor on which the packaged articles are delivered from the machine.

A popular and much used method of merchandising fresh vegetables consists in packaging the cleaned and sorted vegetables in cellophane bags imprinted with the brand name of the distributor and with other data of the type customarily placed on food packages. This method also is widely used in the packaging of certain frozen foods, such as corn-on-the-cob, the cleaned and sorted ears of sweet corn being placed in cellophane bags, generally two ears to the bag, after which the bags are sealed and the corn subjected to a quick-freezing process so as to preserve the original flavor and freshness of the corn. The corn is then distributed for sale by retail food stores in its original frozen condition.

It has been found by the processors of fresh and frozen vegetables that the cost of bagging the articles of food by hand is quite high, due to the time required to perform the operation, and it has been generally recognized that large savings in the cost of processing food articles could be effected if automatic machinery were provided for introducing the articles into the bags. With a view to providing a machine for accomplishing this result, I have devised the machine, hereinafter to be shown and described, which mechanically inserts the vegetables, or similar articles into cellophane bags, this operation being carried out at a much greater rate of speed than was formerly possible using hand methods.

In the machine which I have devised, the articles to be bagged are loaded into trays, which are carried on an endless belt that is advanced in a step-by-step manner as the machine operates. These trays advance the articles from the loading position to a bagging position where they are pushed out of each tray, as it comes to rest in this position, so as to move them into a bagging tube which is arranged to lie opposite the tray located at the bagging position. The ejection of the articles from the trays is accomplished by means of a pusher member which is caused to reciprocate back and forth in synchronism with the step-by-step movement of the tray advancing means. Accordingly, as each tray comes to rest in the bagging position, the pusher member moves forward and pushes the articles out of the tray and into the bagging tube after which the member returns to its original position. The trays are then given another advancing movement so as to bring the succeeding tray into the bagging position whereupon the aforementioned operation of the pusher member will be repeated.

At the same time that the articles are being pushed into the bagging tube, a bag-threading device is actuated so as to thread a cellophane bag over the end of the bagging tube so that by the time the articles have been pushed completely into the tube, a cellophane bag will have been threaded over the tube.

During the return movement of the pusher member, the bagging tube is rocked from its normal, horizontal position to a vertical position, whereupon the articles contained therein will slide out of the tube and strip the bag from the tube. As the filled bag leaves the bagging tube, it is guided by a chute into an upright position between a pair of conveyor belts, the bottom of the bag resting upon a third conveyor belt, which operates at the same speed as the first-mentioned belts. The packaged goods is thereby conveyed out of the machine in an upright position so as to facilitate sealing the open, upper end of the bag as it moves along the conveyor. The bag-sealing means has not been shown in connection with the machine hereinafter disclosed since devices for folding over and sealing the open edges of cellophane bags are well known and a folding and sealing device of preferred type can readily be provided by the user of my machine.

Accordingly, it is an object of my invention to provide a bagging machine in which the articles to be bagged are automatically inserted into bags in a novel and efficient manner.

Another object of my invention is to provide a bagging machine having mechanism for moving the articles to be packaged from a loading position to a bagging position, pushing the articles into a bagging tube, threading a bag over the tube, rocking the bagging tube so as to discharge the articles therefrom and strip the bag from the tube, and, finally conveying the packaged articles out of the machine in an upright position so that the open end of the bag may be folded and sealed.

Another object of the invention is to provide a novel mechanism for threading a bag over the bagging tube.

Another object of the invention is to provide a novel magazine for holding a supply of bags and feeding them to the threading mechanism.

Another object of the invention is to provide a novel means for stripping the bags from the bagging tube.

Another object of the invention is to provide a bagging machine in which the movements of the tray advancing means, the ejecting means, the bag threading means and the bag stripping means are so synchronized with one another as to bring about the automatic packaging of the articles in the bags provided therefor.

Other objects and advantages will become apparent from the following description of a preferred embodiment of my invention shown in the accompanying drawings, in which.

*Machine frame*

Figure 1:
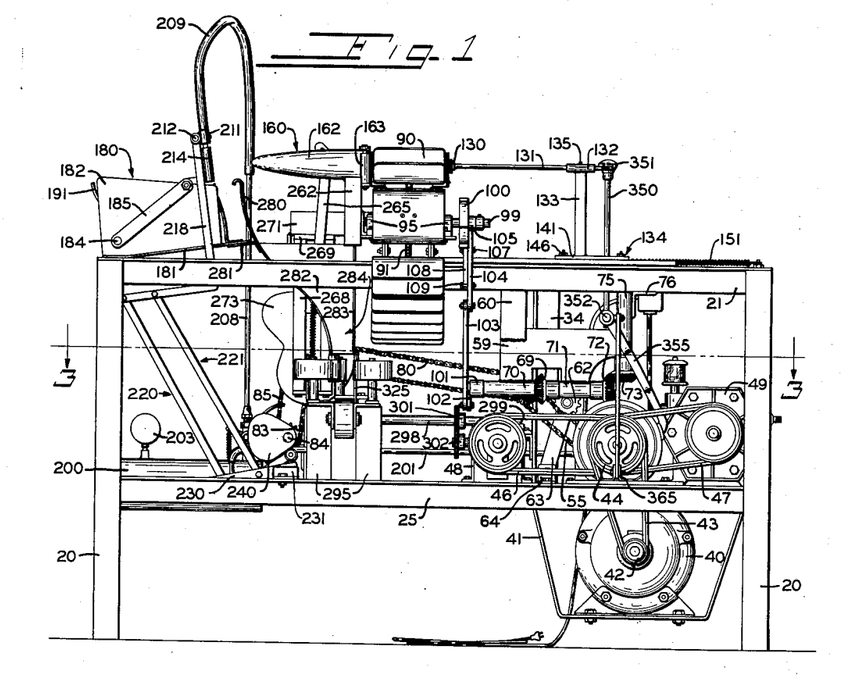
Fig. 1 is a front view of the complete machine.
Figures 2, 5:
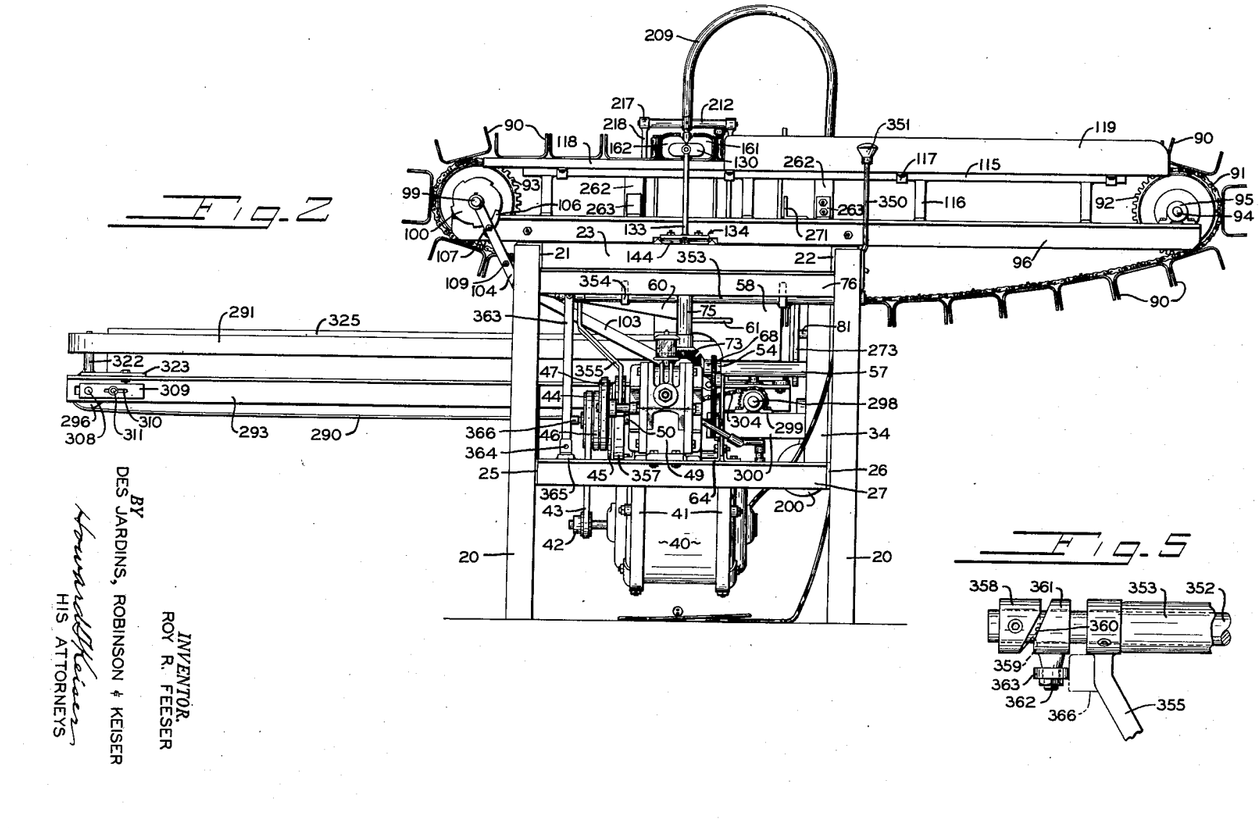
Fig. 2 is a right-hand end view of my bagging machine.
Fig. 5 is a plan view of a portion of the clutch engaging mechanism.
Figures 3, 6:
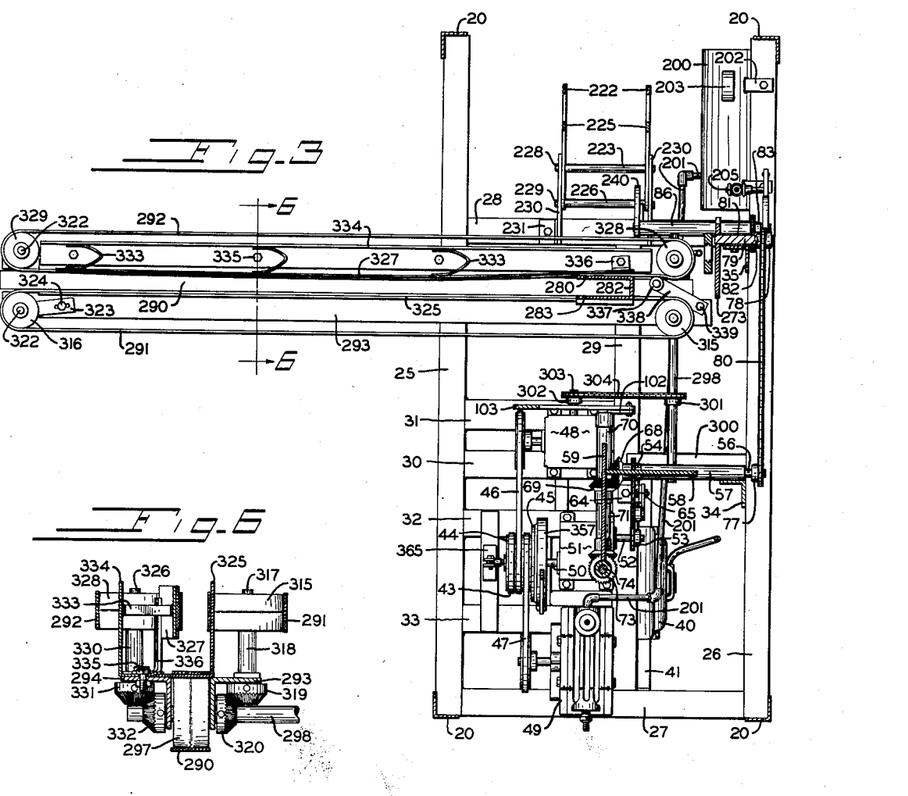
Fig. 3 is a cross-sectional view taken along the line 3—3 in Fig. 1.
Fig. 6 is a cross-sectional view taken along the line 6—6 in Fig. 3.

In the preferred embodiment of my invention hereinafter to be shown and described, the various operating mechanisms of the machine are supported on a frame which is comprised, for the most part, of bars of angle iron which are welded together to form a rigid rectangular frame. As shown in Figs. 1, 2 and 3, this frame consists of four legs 20, of equal height, to the upper ends of which are welded front and rear rails 21 and 22, respectively, and right- and left-hand end rails 23 and 24, respectively (see also Fig. 9).

With the object of providing support for the electric driving motor, the gear reducers, the vacuum pump, the discharge conveyor, and various other elements of the machine, a pair of lower front and rear side rails 25 and 26 (Fig. 3) respectively, are welded between the legs 20 a substantial distance below the upper rails 21 and 22. Also, a lower right-hand end rail 27 is welded between the legs 20 on the right-hand end of the machine so as to lie in the same horizontal plane as the side rails 25 and 26. Extending between the lower side rails 25 and 26 and toward the left-hand end of the machine is a cross rail 28. Extending between the rail 28 and the end rail 27 is an intermediate rail 29 and, extending at right angles to the rail 29, approximately midway between the rails 27 and 28, is an intermediate cross rail 30. Extending between the rails 25 and 29 are additional subordinate cross rails 31, 32 and 33. The rails 25 to 33, inclusive, all lie in the same horizontal plane.

Extending between rear side rails 22 and 26 is a pair of vertical support bars 34 and 35 (Fig. 3) which serve to support certain parts of the machine as will be described later herein. The machine frame also includes certain additional sub-frames which will later be described in connection with the mechanisms which they serve to support.

*Main driving mechanism*

The source of power for operating the entire machine is provided by an electric motor 40 (Figs. 1, 2 and 3) which is supported on hangers 41 which are supported by the lower right-hand end rail 27 and the intermediate cross rail 30. The shaft of the motor 40 is fitted with a V-belt pulley 42 which drives a V-belt 43 which runs over a multiple V-belt pulley 44 secured to the driving side of a friction clutch 45. The pulley 44 is provided with three grooves, one for receiving V-belt 43, one for receiving a V-belt 46 driving a gear reducer 48, and one for receiving a V-belt 47 driving a vacuum pump 49.

Figure 8:
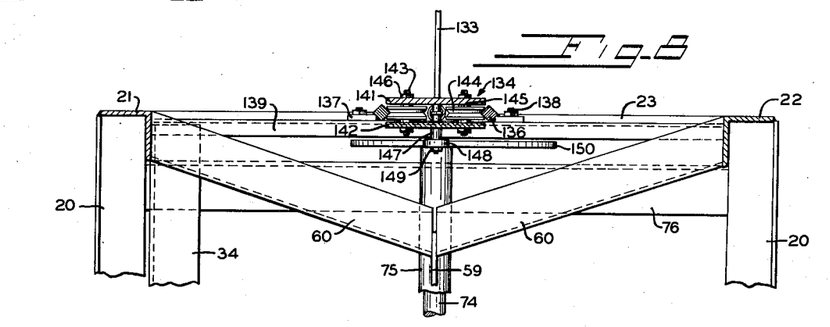
Fig. 8 is a cross-sectional view taken along the line 8—8 in Fig. 7.

The driven side of the clutch 45 is connected with the input shaft 50 of a gear reducer 51 which is supported on cross rail 32 and an auxiliary frame member supported by the rails 29 and 33. The gear reducer 51 is provided with an output shaft 52 on which is mounted a sprocket 53 which drives a sprocket 54 by means of a chain 55 (Fig. 1). The sprocket 54 is secured to a shaft 56 (Fig. 3) which is journaled in a bearing sleeve 57 supported by the post 34 and a vertically disposed supporting plate 58. The plate 58 is welded to a plate 59 lying at right angles thereto, the plate 59 being supported from the side rails 21 and 22 by a pair of angularly disposed supporting bars 60 (see Fig. 8). The plates 58 and 59 are further reinforced by means of a corner plate 61 (Fig. 2) which lies in a horizontal plane and is welded between the two plates.

Reverting to the chain 55 which drivingly connects sprocket 54 with the sprocket 55, an idler sprocket 62 (Fig. 1) is journaled on the upper end of an arm 63 which is secured at its lower end to a bracket 64, by a bolt 65. By loosening the bolt 65, the arm 63 may be swung to a position in which the idler sprocket 62 will engage with the upper reach of the chain 55 and take up any slack present in the chain. The bolt may then be tightened so as to maintain the chain taut and, thus provide a uniform drive between the output shaft 52 of the gear reducer 51 and the shaft 56.

Secured to the left-hand end of the shaft 56 (Fig. 3) is a bevel gear 68 which meshes with a similar bevel gear 69 secured to the center of a horizontal shaft journaled in bearing sleeves 70 and 71 which are suspended from the bottom of the plate 59. The shaft is provided on its right-hand end (Fig. 1) with a bevel gear 72 which meshes with a similar gear 73 secured on the lower end of a vertical shaft 74 (Fig. 3). The shaft 74 is journaled in a vertically disposed bearing sleeve 75 (Figs. 1 and 2) which is welded to the right-hand edge of the plate 59 and also to the vertical flange of an angle bar 76 which extends between the front and rear side rails 21 and 22 and is welded at its opposite ends to the bottom edges of these rails.

Inasmuch as the output shaft 52 of the gear reducer 51 is so connected with the motor 40 as to be rotated in a counterclockwise direction, as viewed from the front of the machine, the shaft 56 will likewise be caused to rotate in a counterclockwise direction when viewed from the front, and the shaft 74 will therefore be caused to rotate counterclockwise as viewed from the top of the machine.

Secured to the rear end of the shaft 56 is a sprocket 77 which drives a sprocket 78 secured to the rear end of a shaft 79 by means of a driving chain 80. The shaft 79 is journaled in a bearing sleeve 81 which is supported on the vertical post 35.

Also secured to the right-hand end of the shaft 79 is a second sprocket 82 which drives a sprocket 83 secured to the rear end of a shaft 84 (Fig. 1) by means of a driving chain 85. The shaft 84 is journaled in a bearing sleeve 86 (Fig. 3) which is supported from the vertical post 35 by means of an angle bracket (not shown).

Since the shaft 56 is rotated counterclockwise as viewed from the front of the machine the shafts 79 and 84 will likewise be rotated counterclockwise when viewed from the front. Attention is also called to the fact that the driving mechanism including the shafts 52, 56, 74, 79 and 84 as well as the shaft (not shown) on which the bevel gears 69 and 72 are secured constitutes what will hereinafter be referred to as the main driving mechanism of the machine.

Receiving and advancing means

In the present machine means is provided for receiving the cleaned and sorted vegetables or other articles to be bagged and for automatically advancing them to the bagging position where they are automatically inserted in cellophane bags provided for this purpose. As best shown in Fig. 2, the receiving and advancing means is comprised of a series of trays 90 which are attached to and carried by an endless chain 91 which runs over a pair of spaced sprockets 92 and 93. The sprocket 92 is an idler sprocket and is secured to a shaft 94 which is journaled at either end in pillow blocks 95 which are supported on the horizontal flanges of a pair of spaced angle bars 96 and 97 (see also Figs. 7 and 13). The bars 96 and 97 are supported on the machine frame by means of angle brackets 98 (Fig. 13) which are seated upon and secured to the front and rear side rails 21 and 22. The driving sprocket 93 is secured to a shaft 99 which, like the shaft 94 for the idler sprocket 92, is journaled in pillow blocks 95 (Fig. 1) supported on the horizontal flanges of the angle bars 96 and 97. Also secured to the shaft 99 is a five-toothed ratchet wheel 100 (Fig. 2) which is driven from the main driving mechanism of the machine in the following manner:

As shown in Fig. 1, the horizontal shaft to which the bevel gears 69 and 72 are secured has mounted on its left-hand end a hub 101 to which a crank arm 102 is rigidly secured. Pivotally connected to the outer end of the crank arm 102 is the lower end of a link 103 (also Fig. 2) which, at its upper end, is pivotally connected to the lower end of an arm 104. The upper end of the arm 104 is provided with a hub 105 (Fig. 1) which is received on the shaft 99 and is freely rotatable thereon. The arm 104 will thus be rocked back and forth about the shaft 99 as the crank arm 102 is revolved by the main driving mechanism of the machine.

The arm 104 carries a pawl 106 which is pivoted on the arm at 107 and is biased toward engagement with the ratchet wheel 100 by a leaf spring 108 (Fig. 1) which is rigidly secured at its upper end to the pawl 106 and, at its lower end, is secured to the arm 104 by a bolt 109. Hence, each time the arm is rocked, the pawl 106 will advance the ratchet wheel 100 one tooth space, the stroke of the arm 104 being such that the ratchet wheel will be rotated one-fifth of a revolution counterclockwise as viewed in Fig. 2 for each excursion of the arm 104. Inasmuch as the sprocket 93 is provided with thirty-five teeth, the sprocket will be advanced seven teeth in a counterclockwise direction for each excursion of the arm 104. Since the trays 90 are connected to every seventh link of the chain 91, it will become evident that each tray will move into the position formerly occupied by the preceding tray each time the arm 104 is given a complete excursion. The trays are therefore advanced step-by-step on each rotation of the crank arm 102. Since a 1:1 driving ratio is maintained between the shafts 56, 74, 79 and 84, and the shaft on which the crank arm 102 is mounted, the trays will be advanced one step for each complete revolution of each of these shafts.

Figure 7:
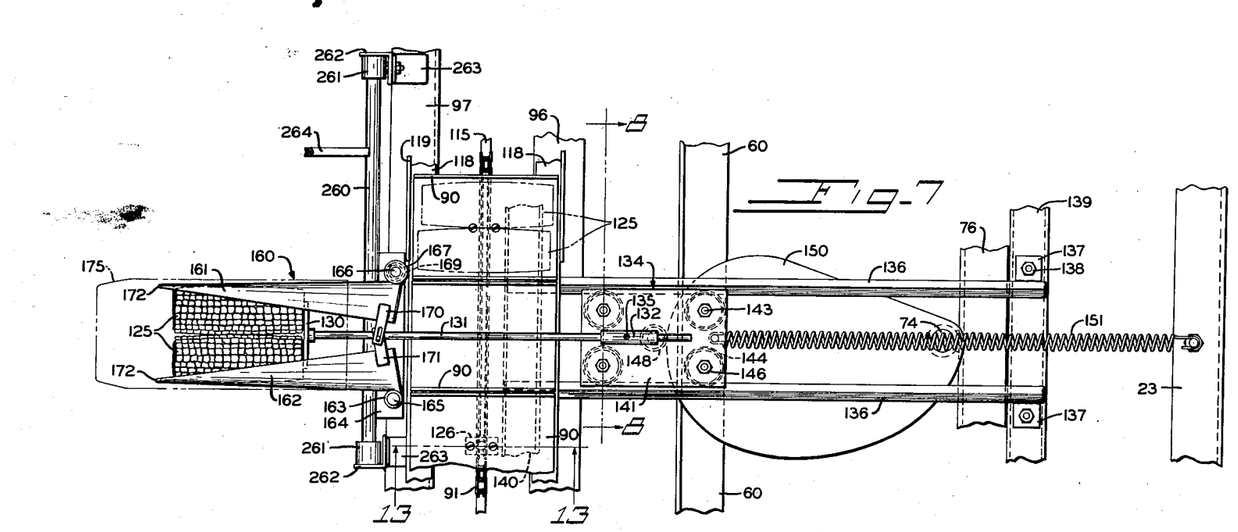
Fig. 7 is a plan view showing certain details of the ejecting mechanism and the bagging tube.
Figures 12, 13:
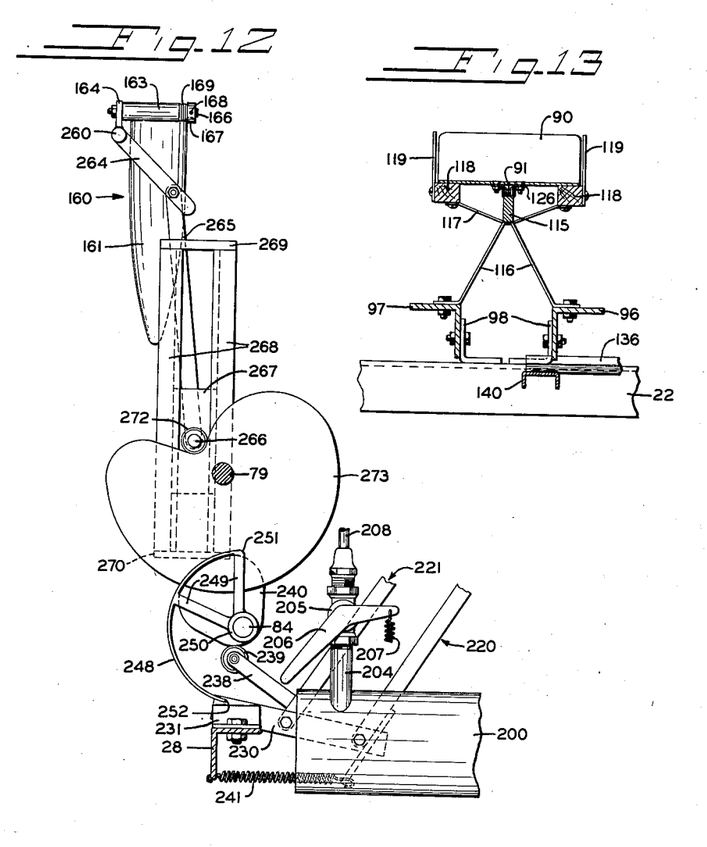
Fig. 12 is a rear view of a portion of the machine, with parts removed, showing further details of the bag threading mechanism and the bag stripping mechanism.
Fig. 13 is a cross-sectional view taken along the line 13—13 in Fig. 7.

As best shown in Figs. 2, 7 and 13, the upper reach of the chain 91 is supported by and adapted to slide along the upper edge of a horizontal bar 115 which is supported from the angle bars 96 and 97 by angularly disposed struts 116. Also secured to the bar 115 are brackets 117 which serve to support a pair of wood bars 118 which support the ends of the trays 90 as they move along the upper reach of the chain from idler sprocket 92 to driving sprocket 93. Retaining plates 119 are fastened to the outer edges of bars 118 and extend upwardly therefrom so as to close the ends of the trays as they move along the upper reach of the chain from the idler sprocket 92 to the position where the articles to be bagged are pushed out of the trays, hereinafter referred to as the "bagging position." The retaining plates 119 serve to effectively close the ends of the trays and thereby prevent endwise displacement of the articles from the trays. The portion of the conveyor enclosed by the plates 119 may be termed the "loading position" inasmuch as it is along this portion of the conveyor that the cleaned and sorted vegetables or other articles are loaded into the trays 90 preparatory to the bagging operation.

In the machine shown in the accompanying drawings, the article handling parts are of suitable size and shape to accommodate two moderately sized ears of sweet corn, as shown in Fig. 7, each tray 90 is adapted to receive two ears of corn 125 lying abreast of one another within the tray. It is, of course, to be realized that if it is desired to bag a different type of article or a different number of ears to the bag, the size of the trays would have to be modified accordingly.

Each tray 90 is secured to the chain 91 by means of a bracket 126 which, as shown in Fig. 7, is attached to one link of a chain 91 and also to the center of its associated tray 90. As mentioned earlier herein, one of the brackets 126 is connected to every seventh link of the chain and the chain is advanced seven links for each cycle of operation of the main operating mechanism.

Ejecting mechanism

As each tray loaded with two ears of corn is brought to rest in the bagging position, an ejecting means is rendered operative to push the ears of corn out of the tray and into a bagging tube. As best shown in Figs. 1, 2 and 7, a pusher member 130 is mounted on the end of a horizontal bar 131 which, at its opposite end, is supported within a sleeve 132 mounted on the upper end of a post 133 mounted on a carriage 134. The bar 131 is slidable within the sleeve 132 and may be adjusted in or out of said sleeve by loosening a set screw 135 which is provided in the sleeve for holding the bar in any adjusted position.

The carriage 134 is arranged for rolling movement along a track comprised of bars 136 which are of square cross section and are supported on the frame of the machine. As shown in Fig. 7, the right-hand ends of the bars 136 are welded to brackets 137 which are fastened by bolts 138 to a transversely extending channel bar 139 which extends between and is secured at either end to the upper side rails 21 and 22. At their opposite ends, the bars 136 are supported in a like manner on a channel bar 140 (see also Fig. 13) which, like the bar 139, extends between and is supported at either end by the side rails 21 and 22.

The carriage 134 (best shown in Figs. 7 and 8) is comprised of a top plate 141 and a bottom plate 142, both of which have four holes bored therein for receiving the threaded ends of axles 143. On the central part of each axle between plates 141 and 142 is journaled a grooved wheel 144 which is prevented from moving longitudinally along the axle by a pair of nuts 145, screwed onto the threaded ends of the axle. The plates 141 and 142 are secured to the axles 143 by means of nuts 146 which are screwed down against the plates so as to tighten the plates against the nuts 145.

Secured to the center of the lower plate 142 and extending downwardly therefrom is a shouldered stud 147 on which is journaled a roller 148 which is retained in place on the stud by means of a nut 149 which is screwed onto threads provided on the lower end of the stud. The roller 148 is adapted to bear against the periphery of a cam 150 which is mounted on the upper end of shaft 74 so that the cam will make one revolution in a counterclockwise direction, as viewed from the top of the machine, for each cycle of operation of the main driving mechanism. The roller 148 is held in contact with the periphery of the cam 150 by means of a spring 151 tensioned between the top plate 141 of the carriage and the right-hand end rail 23 of the machine frame. Hence, for each cycle of operation of the main driving mechanism, the pusher member 130 supported on the carriage 134 will be reciprocated forward and backward so as to push the ears of corn in the tray located at the bagging position out of the tray and into the bagging tube.

Bagging tube

Figures 9, 10, 11:
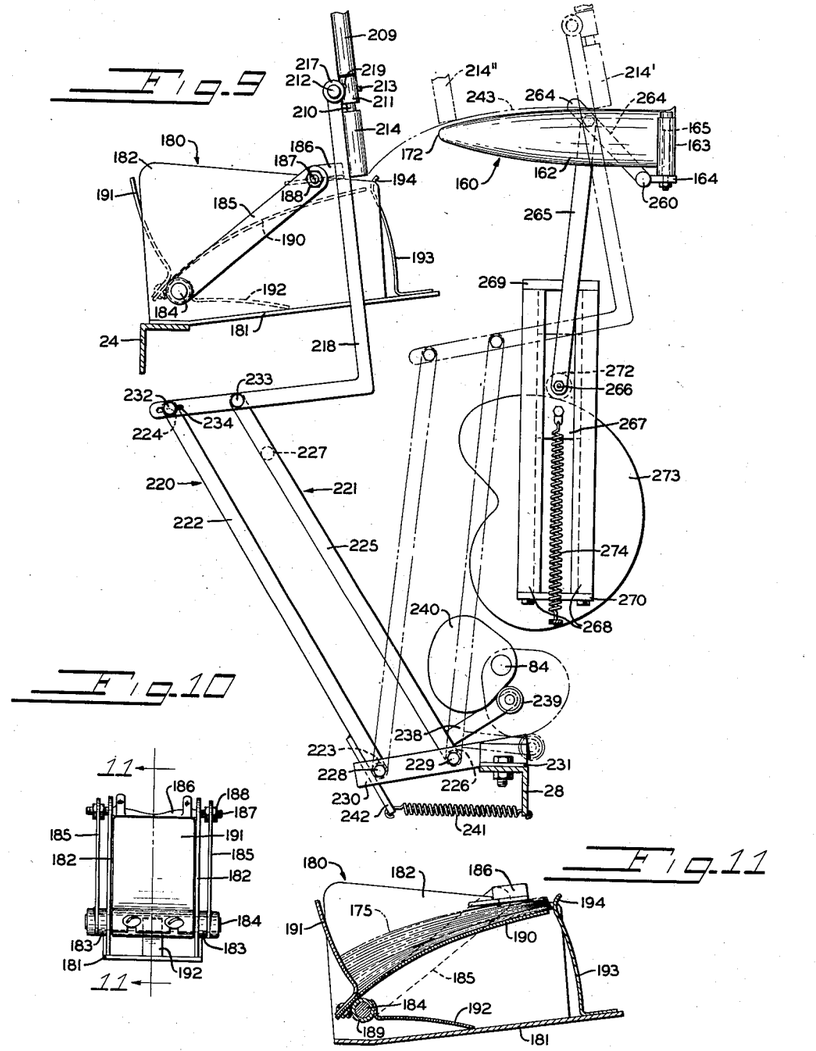
Fig. 9 is a front view of a portion of the machine, with parts removed, showing in detail portions of the bag threading mechanism and the bag stripping mechanism.
Fig. 10 is an end view of the bag magazine.
Fig. 11 is a cross-sectional view taken along the line 11—11 in Fig. 10.

Located at the bagging position and directly opposite the left-hand edge of the tray 90 located at this position is a bagging tube 160. This tube is comprised of two semi-conical shells 161 and 162 which normally lie in a closed position but which are free to expand to the position shown in Fig. 7 when the ears of corn 125 are forced therein by the pusher member 130. Each shell has secured thereto at its large end a bearing sleeve 163. As best shown in Fig. 9, the shell 162 is supported for pivotal movement on a supporting plate 164 by means of a headed pin 165 which passes through sleeve 163 and is provided with a threaded tenon at its lower end by means of which it may be fastened to the plate 164.

As shown in Fig. 12, the shell 161 is pivotally supported on the plate 164 by means of a pin 166 which, like the pin 165, is provided at its lower end with a threaded tenon by means of which the pin may be fastened to the plate 164. On the upper end of the pin 166 is a collar 167 provided with a set screw 168 by means of which the collar may be secured to the pin. Wound around the pin 166 between the upper end of the sleeve 163 and the collar 167 is a torsion spring 169, the lower end of which is secured to the sleeve 163 and the upper end of which is secured to the collar 167. This spring acts to rotate the shell 161 in a counterclockwise direction as viewed in Fig. 7 so as to normally urge the shell 161 into contact with the shell 162. Secured to the upper edge of shell 161 near the large end thereof is a slotted plate 170 which cooperates with a pin mounted in a plate 171 secured to the upper edge of the shell 162. By virtue of this pin and slot connection between the shells, a scissors action is provided therebetween so that counterclockwise rotation of the shell 161 will cause clockwise rotation of the shell 162, and vice versa. Therefore, when the tube 160 is empty, the shells will be urged toward one another by the torsion spring 169 and the pointed ends 172 of the shells will be brought together so that the tube 160 will present a pointed end to the bags being threaded thereon.

Bag magazine

In the present machine, means is provided for threading a cellophane bag over the end of the tube 160 prior to the insertion of the corn therein so that by the time the corn has been moved into the tube as illustrated in Fig. 7, a bag 175 will be in place over the outside of the tube. As best illustrated in Figs. 1, 9, 10 and 11, the bags 175 are contained in a magazine 180 which is supported on the left-hand end rail 24 of the machine frame. This magazine is comprised of a bottom plate 181 which, at its left-hand end, is welded or otherwise rigidly secured to the horizontal flange of the end rail 24. Secured to the bottom plate 181 are two spaced side plates 182. Each side plate has secured thereto a bushing 183 which is bored to receive a transverse shaft 184 which has secured to either end thereof, outside the bushings 183, weight-supporting arms 185. At their upper ends, the arms 185 support between them a weight 186 which is adapted to bear against the stack of bags contained within the magazine. The weight 186 is attached to the arms 185 by means of threaded tenons 187 provided on either end thereof which extend through holes provided in the upper ends of the arms 185 and are secured thereto by means of nuts 188. The top edge of each side plate 182 is provided with a shallow notch for receiving the tenons 187 which are caused to seat in the notches and be maintained in contact therewith by means of the weight 186.

Journaled on the shaft 184 between the side plates 182 is a sleeve 189 (Fig. 11) to which is fastened a bag feed plate 190 and a bag retaining plate 191. Also secured to the sleeve 189 is a leaf spring 192 the free end of which bears against the bottom plate 181 and resiliently urges the plates 190 and 191 in a counterclockwise direction as viewed in Fig. 11. By virtue of the leaf spring 192, the bags 175 resting on the plate 190 are yieldingly urged into contact with the bottom of the weight 186. Hence, as each bag is removed from the top of the stack contained in the magazine, the plate 190 will be elevated slightly by the spring 192 thereby maintaining the top bag in the stack at a predetermined, constant level regardless of the number of bags in the stack.

The front of the bag magazine 180 is closed by a plate 193 which is secured to the bottom plate 181 and projects upwardly therefrom in front of the open ends of the bags stacked in the magazine. The plate 193 is provided at its upper end with a curved lip 194 over which the bags may slide as they are removed one by one from the stack.

Bag threading device

As indicated earlier herein, means is provided for removing a bag from the magazine and threading it over the pointed end of the bagging tube 160 prior to the insertion of the corn therein. This is accomplished by means of a vacuum hose, the lower, open end of which is moved on each cycle of the main driving mechanism from a position in which it lies directly over the top bag on the stack contained in the magazine, to a position along the surface of the bagging tube, after which the vacuum is broken and the hose is returned to its initial position.

It will be recalled that a vacuum pump 49 (Fig. 1) is continuously driven by the motor 40 by means of a drive including V-belts 43 and 47 and multiple V-belt pulley 44. The pump 49 is connected with a vacuum tank 200 by means of a vacuum line 201, the tank being supported from the lower rear side rail 26 by means of brackets 202. Communicatively connected with the tank 200 is a vacuum gauge 203 for indicating the vacuum created within the tank 200 by the vacuum pump 49.

As best illustrated in Fig. 12, the vacuum tank 200 is fitted with a pipe 204 to which is attached a cut-off valve 205 which may be turned on or off by rotation of a bell crank 206 secured to the rotatable element of the valve. The valve is normally maintained in its "off" position by means of a spring 207 tensioned between one end of the bell crank 206 and a spring hook secured to the rail 26. Also connected to the valve 205 is a vertically extending vacuum line 208 which, at its upper end, is fitted with a length of flexible hose 209 (Fig. 9). The opposite end of the hose is fitted to the upper end of a short piece of tubing 210 (Fig. 9) which passes through a sleeve 211 welded to a transverse rod 212. The sleeve 211 is provided with a set screw 213 by means of which the tube 210 may be clamped in position within the sleeve 211. Fitted on the lower end of the tube 210 is a short length of hose 214 which, in the normal position of the machine, lies with its open end directly above the top bag on the stack contained in the bag magazine.

As shown in Figs. 2 and 9, the rod 212 is supported at either end in bearings 217 provided on the upper ends of L-shaped arms 218. The bearings 217 are provided with set screws 219 by means of which the rod 212 can be clamped in any rotational position within the bearings 217.

As best shown in Figs. 3 and 9, the arms 218 are supported by a pair of rectangularly shaped frames 220 and 221. The frame 220 is comprised of a pair of spaced bars 222 (Fig. 3) which are secured to one another at their lower ends by a sleeve 223 and at their upper ends by a similar sleeve 224. The bars 222 are welded to the ends of the sleeves 223 and 224 so as to provide a rigid rectangular frame. In a similar manner, the frame 221 is comprised of a pair of spaced bars 225 which are rigidly secured to one another at their lower ends by a sleeve 226 and at their upper ends by a spacer bar 227 (Fig. 9). The frames 220 and 221 are journaled at their lower ends on bearing pins 228 and 229, respectively, which extend between a pair of support bars 230 which are mounted on the cross rail 28 by means of brackets 231. At their upper ends, the frames 220 and 221 are attached to the horizontal arms of L-bars 218 by pins 232 and 233, respectively. A round hole is provided in each of the arms 218 for receiving the pin 233, whereas an elongated slot 234 is provided in each of the arms 218 for receiving the pin 232. In this way an adjustment is provided, the purpose of which will be described at a later point in the description.

As best shown in Fig. 9, the rear arm 225 of the frame 221 has rigidly secured thereto an arm 238 on the end of which is mounted a roller 239 which is adapted to ride on the periphery of a cam 240 mounted on the forward end of the shaft 84. The roller 239 is maintained in contact with the periphery of the cam 240 by means of a spring 241 tensioned between an extension bar 242 secured to one of the bars 222 and the vertical flange of the cross rail 28. It will be recalled that the shaft 84 rotates in a counterclockwise direction as viewed from the front of the machine (Fig. 9) whereby the cam 240 will likewise be rotated counterclockwise and thereby cause the frames 220 and 221 to assume the position shown in dot-and-dash lines in Fig. 9 when the cam 240 has moved to the position illustrated by dot-and-dash lines in this figure. Correspondingly, the L-shaped bars 218 will be moved from their full line positions to the positions shown by dot-and-dash lines, thereby carrying the hose 214 to the position indicated by reference numeral 214'. When the cam 240 now continues to rotate until it again reaches the solid line position shown in Fig. 9, the bars 218 and hose 214 will be returned by spring 241 to their initial positions. The path of travel of the lower end of hose 214 is indicated by the dot-and-dash line 243 in Fig. 9 and the position of the hose as it passes over the apex of the bagging tube 160 is indicated by reference numeral 214''.

The path of travel of the lower end of hose 214 may be varied somewhat by adjustment of the pin 232 back and forth in the slot 234. When a position is found in which the lower end of the tube just clears the pointed end of the tube 160 and follows the top surface of the tube to the position 214', the pin may, by suitable means provided therefor, be clamped in place within the slot 234.

For the purpose of controlling the application of suction to the hose 214, a curved cam plate 248 (Fig. 12) is provided. The cam plate 248 is supported on arms 249 which are mounted on a hub 250 secured to the rear end of shaft 84. As viewed in Fig. 12, the shaft 84 will be rotated clockwise by the main driving mechanism of the machine so as to bring a rounded surface 251 provided on the forward edge of the cam plate 248 into contact with the downwardly-extending arm of the bell crank 206 and thereby cause the arm to be rotated counterclockwise against the tension of spring 207. The valve 205 will thereby be moved to its "On" position and suction will be applied to the hose 214 through the line 208, hose 209 and tube 210. Application of suction to the hose 214 will be maintained until the arm of the bell crank 206 is released by the plate 248, that is after the trailing edge 252 of the plate passes beyond the end of the arm. When this occurs, the spring 207 will return the valve 205 to its "Off" position. Due to the relative positions of the cam 240 and the cam plate 248 on the shaft 84, suction will be applied to the hose 214 before it commences to move toward the bagging tube and will be cut off before the hose begins its return movement.

When suction is applied to the hose 214, the top bag 175 on the stack contained in the bag magazine will be seized by the hose and, as the latter commences to move toward the bagging tube, the bag will be drawn out of the magazine over the curved lip 194. Since the hose 214 seizes the upper fold of the bag and, since the movement of the hose toward the bagging tube is fairly rapid, the air rushing past the mouth of the bag will cause it to open and pass over the pointed end 172 of the bagging tube 160 when the hose passes the position indicated by reference numeral 214″. As the hose continues to move to the position indicated by reference numeral 214′, the bag 175 will be threaded completely over the tube in the manner indicated in Fig. 7. Due to the shape of the cam 240, the hose 214 will dwell for an interval in its fully moved position and, during this time, the cam plate 248 will release the bell crank 206 permitting the valve 205 to move to its "Off" position. The hose 214 will thereupon release the bag 175 and permit the bag to remain on the tube when the hose is returned to its initial position.

Bag stripping mechanism

After the bag has been threaded on the tube 160 and the corn has been pushed into the tube as indicated in Fig. 7, means is provided for rotating the tube from the position shown in Fig. 9 to the position shown in Fig. 12. As the tube rocks downwardly from the Fig. 9 position to the Fig. 12 position, the ears of corn 125 contained in the tube will by their own weight, slide out of the tube and carry the bag with them, thereby stripping the bag from the tube 160.

As was earlier described herein, the shells 161 and 162 are pivotally supported on the support plate 164 which is secured to a shaft 260 (Figs. 7, 9 and 12) journaled at either end in bearings 261. The bearings 261 are supported on a pair of upright angles 262 which are attached by brackets 263 to the angle bar 97.

Projecting from the shaft 260 and rigid therewith is a crank arm 264 to which is pivotally connected the upper end of a link 265. At its lower end, the link 265 is journaled on a shouldered stud 266 carried by a crosshead 267. This crosshead is guided for vertical sliding movement between a pair of grooved guide rails 268 attached at their upper ends to a spacing plate 269 and at their lower ends to a spacing plate 270. The track thus formed by the rails 268 and plates 269 and 270 is supported in a vertical position in the machine by means of an angle bar 271 (Fig. 1) secured to and projecting rearwardly from the angle bar 97.

The stud 266 extends through the crosshead 267 where it has journaled thereon a roller 272 which is adapted to ride on the periphery of a cam 273 mounted on the forward end of shaft 79. The roller 272 is maintained in contact with the periphery of the cam by means of a spring 274 (Fig. 9) tensioned between the crosshead 267 and an element of the machine frame. It will be recalled that the shaft 79 is rotated in a counterclockwise direction as viewed from the front of the machine (Fig. 9) or, in a clockwise direction, as viewed from the rear of the machine (Fig. 12). In the normal position of the machine, the cam 273 occupies the position shown in Fig. 9 with the tube 160 located in its elevated or horizontal position. However, as the cam rotates, a low spot on the cam is brought beneath the roller 272 thereby permitting the spring 274 to draw down the crosshead 267 to the position illustrated in Fig. 12. When this occurs, the link 265 will act on the crank arm 264 to rotate the shaft 260 clockwise as viewed from the rear of the machine, thereby causing the tube 160 to be lowered into the vertical position. As mentioned earlier herein, the corn which has been moved into the tube by the pusher member will slide out of the tube as it is rocked from the horizontal position to the vertical position and strip the bag 175 off the tube. After the corn and bag have been discharged from the tube, the latter will again be elevated to its horizontal position by the cam 273 acting on the roller 272. After the corn has been discharged from the tube, the torsion spring 169 (Fig. 12) will urge the shells 161 and 162 into engagement with one another so that the points 172 will be brought together, ready for the threading of another bag thereover.

Package delivery chute

When the bag and the corn contained therein are discharged from the tube 160 they will drop into a guide chute which is provided for the purpose of ensuring that the bag and its contents will fall in an upright position onto the discharge conveyor. As shown in Fig. 1, this chute is comprised of a curved plate 280 which lies in front of the pointed end of the bagging tube 160 and is curved so as to follow the path traced by the end of the tube as it is lowered to its vertical position. The plate 280 is supported on a bracket 281 secured to the forward end of the bottom plate 181 of the bag magazine. The guide chute is also provided with a back plate 282 and an end plate 283 so as to close the chute on three sides. The fourth, or front, side of the chute is left open so as to permit the corn to move therefrom along the discharge conveyor. As shown in Fig. 1, the lower edge of the end plate 283 is offset toward the right so as to form a shoulder which is adapted to rest on top of a plate 325 hereinafter to be described. As the bagging tube 160 rocks from its horizontal position, shown in Fig. 1, to the vertical position, shown in Fig. 12, the bottom of the bag containing the ears of corn will bear against the guide plate 280 and follow the contour of this plate until the tube is nearly vertical whereupon the package of corn will enter into the mouth portion 284 of the guide chute and be caused to drop on the conveyor in an upright position.

Discharge conveyor

As shown in Figs. 3 and 6, the discharge conveyor is comprised of three endless belts 290, 291 and 292. The upper reach of the belt 290 constitutes the bottom of the conveyor while the inner reaches of the belts 291 and 292 constitute the sides thereof. The direction of travel of the belts is such that the upper reach of the belt 290 and the inner reaches of the belts 291 and 292 all travel in the same direction, that is, from right to left as viewed in Fig. 3. Also, the belts all travel at the same velocity and thereby hold the packaged corn in its original upright position throughout the length of the conveyor.

The conveyor is provided with a supporting frame consisting of a pair of spaced, horizontal angle bars 293 and 294 (Fig. 6) which are supported on vertical posts 295 (Fig. 1) projecting upwardly from rails 25 and 29.

The belt 290 is stretched between a pair of pulleys 296 and 297 (Figs. 2 and 6) which rotate about horizontal axes. The rear pulley 297 serves to drive the belt while the forward pulley 296 is merely an idler over which the belt runs freely. The rear pulley 297 is secured to a shaft 298 which, at its left-hand end is journaled in bushings provided in the vertical flanges of bars 293 and 294. The right-hand end of shaft 298 is journaled in a bearing 299 (Fig. 2) which is supported on a horizontal angle bar 300 (Fig. 2) welded to the vertical bar 34.

Secured to the shaft 298 is a sprocket 301 which is connected with a second sprocket 302 mounted on the end of output shaft 303 of gear reducer 48 by a chain 304. It will be recalled that the gear reducer 48 is driven by the motor 40 through a V-belt 46 driven from the multiple pulley 44. Therefore, as long as the motor 40 is running, the gear reducer 48 will be operated thereby continuously rotating shaft 298 and the belts of the discharge conveyor.

The forward pulley 296 over which the belt 290 runs idly is journaled on a shaft 308 (Fig. 2) which is secured at either end to plates 309 lying alongside the vertical flanges of bars 293 and 294. The plates 309 are provided with elongated slots 310 for receiving bolts 311 by means of which the plates may be clamped in position on the bars 293 and 294. By virtue of this pin and slot arrangement, the pulley 296 may be adjusted forward or backward for the purpose of tightening the belt 290.

The belt 291 is stretched between a rear driving pulley 315 and a forward idler pulley 316 as illustrated in Fig. 3. As shown in Fig. 6, the driving pulley 315 is mounted on the upper end of a stub shaft 317 which is journaled in a bearing sleeve 318 secured in a vertical position on the angle bar 293. Fastened on the lower end of the shaft 317 is a bevel gear 319 which meshes with a second bevel gear 320 secured to the shaft 298. Hence, rotation of the shaft 298 will cause pulley 315 to be rotated and the belt 291 to be driven.

As illustrated in Figs. 2 and 3, the idler pulley 316 is journaled on the upper end of a pin 322 which is supported on the forward end of an adjusting plate 323. The plate 323 is arranged to be adjustably secured to the horizontal flange of the bar 293 by means of a bolt 324 passing through an elongated slot provided in the plate 323. In this way, the idler pulley 316 may be adjusted forward or backward to take up slack in the belt 291 and may also be swung about the bolt 324 so as to adjust the position of the forward end of the belt 291 with relation to belt 292.

The belt 292 is stretched between a driving pulley 328 and an idler pulley 329. As shown in Fig. 6, the pulley 328 is secured to the upper end of a stub shaft 326 which is journaled in a bearing sleeve 330 secured to and extending upwardly from the horizontal flange of angle bar 294. Mounted on the lower end of shaft 326 is a bevel gear 331 which meshes with a similar gear 332 secured to the left-hand end of shaft 299.

The idler pulley 329, like the idler pulley 316, is journaled on the upper end of a pin 322 which is mounted on an adjusting plate (not shown) which, like the plate 323, is adjustably secured to the angle bar 294 so as to permit adjustment of the idler pulley 329.

The upper reach of the belt 290 and the inner reach of the belt 291 are supported by an angle plate 325 which is welded at its apex along the corner of the bar 293 as shown in Fig. 6.

In order to resiliently bias the inner reach of the belt 292 toward the inner reach of the belt 291, a biasing plate 327 is mounted for yielding movement in a horizontal direction by means of leaf springs 333. The springs 333 are in the form of curved, flat strips of metal (Figs. 3 and 6) having one end welded to the plate 327 and the other end welded to the vertical portion of an angle plate 334. As clearly shown in Fig. 6, the horizontal flange of this plate rests on top of the horizontal flange of angle bar 294 and is secured thereto by bolts 335.

The right-hand end of the plate 327 is curved inwardly toward the vertical flange of plates 334 (Fig. 3) where it is supported by an angle bracket 336 bolted to the horizontal flange of bar 294. The inner end of the belt 292 is forced into engagement with the inner end of the plate 327 by means of an idler pulley 337 which is journaled on an upright pin mounted on the end of a flat plate 338. The plate is held in position with the idler pulley 337 bearing against the belt 292 by a bolt 339 passing through the end of the plate and through the horizontal flange of bar 293. In this manner a wider spacing is provided between the belts 291 and 292 at their inner ends so as to permit the packaged corn to fall freely to the bottom of the guide chute whereupon the lower end of the package will come in contact with the belt 290 and be started in motion toward the left as viewed in Fig. 3. The package will thus be moved into the constricted area lying just to the left of the guide chute where it will be picked up by the belts 291 and 292 and moved in an upright position toward the outer end of the conveyor. As the packaged corn moves outwardly along the conveyor, it will be maintained in contact with the belts 291 and 292 by means of the light pressure applied thereto by leaf springs 333 which act on the belt through the plate 327.

Since the package containing the corn will be moved edgewise along the conveyor, that is, with one ear following behind the other in the direction of travel, the upper, open end of the bag will be presented to the folding and sealing device (not shown), which may be of any desired type which the user of the machine wishes to employ, in the proper position for folding over the edge of the bag and sealing it together. This folding and sealing device has not been shown in conjunction with the machine herein disclosed since these devices are well known and may readily be applied to the machine by the user thereof at any point along the line of travel of the corn on the discharge conveyor.

*Clutch control mechanism*

In order to enable the main driving mechanism of the machine to be started or stopped while the driving motor 40 continues to run, I have, as previously mentioned herein, provided a friction clutch 45 between the multiple pulley 44 driven by the motor and the gear reducer 51 which supplies the power for the main driving mechanism. This clutch may be engaged or disengaged at will by means of a clutch control lever 350 located on the right-hand side of the machine as viewed in Fig. 2. The lever 350 is provided at its upper end wtih a hand knob 351 and, at its lower end, is attached to one end of a shaft 352 which is journaled in a tube 353 supported from the angle bar 76 by brackets 354. On the end of the shaft 352, opposite the end on which the lever 350 is attached, is a brake arm 355 on the end of which is mounted a brake shoe 356. When the clutch control lever 350 is in the position shown in Fig. 1, the brake shoe 356 is adapted to bear against a brake drum 357 (Fig. 3) provided on the driven side of the clutch 45. When the lever 350 is moved from the Fig. 1 position, which is the clutch disengaged position, to the Fig. 4 position, which is the clutch engaged position, the shaft 352 will be rocked counterclockwise as viewed in Fig. 4 so as to move the brake shoe 356 away from the brake drum 357 as illustrated in this figure.

Also secured to the shaft 352 adjacent the brake arm 355 is a clutch-engaging cam 358 (Fig. 5) provided with a cam face 359 which is adapted to cooperate with a cam face 360 provided on a slider 361. This slider is bored so as to be freely slidable along the shaft 352 and is provided with a threaded projection 362 by means of which it may be secured to the upper end of a clutch-engaging arm 363. The lower end of the arm 363 is pivoted at 364 (Fig. 2) in a bracket 365 mounted on the machine frame. The friction clutch 45 is provided with an operating button 366 by means of which the driving side of the clutch may be engaged with or disengaged from the driven side. An internal spring within the clutch acts to normally disengage the clutch and to move the button 366 toward the left as viewed in Fig. 2. The button 366 is adapted to bear against the edge of the arm 363 just above the pivot 364 and tends to rock the arm counterclockwise about the pivot. As illustrated in Fig. 5, this action of the button 366 on the arm 363 causes the cam faces 359 and 360 to be maintained in engagement with one another. When the clutch control lever 350 is moved to the engaged position, illustrated in Fig. 4, the cam face 359 (Fig. 5) will act on the cam face 360 and force the slider 361 toward the right as viewed in Fig. 5, thereby causing the button 366 to be moved inwardly and the clutch to be engaged. The main driving mechanism of the machine will now be caused to operate until the clutch control lever 350 is again returned to the position shown in Fig. 1. When this occurs, the cam face 359 will move upwardly on the cam face 360 and permit the slider 361 to move toward the left under the influence of the internal spring in the clutch which acts to press out the button 366. The clutch will thus be disengaged and the brake shoe 356 will be brought to bear against the brake drum 357 thereby stopping the rotation of the driven side of the clutch. The main driving mechanism of the machine will thus be brought to rest almost immediately after the lever 350 is moved to its Fig. 1 position and "coasting" of the machine after the clutch control lever has been operated to stop the machine will be held to a minimum.

*Operation*

The machine hereinbefore described is placed in operation by connecting the electric motor 40 with a suitable source of electrical energy so as to cause the motor to drive the multiple V-belt pulley 44 through V-belt 43. This will cause the driving side of the clutch 45 to be operated and the vacuum pump 49 and the gear reducer 48 to be driven. Hence, a vacuum will be created within the tank 200 and the discharge conveyor, previously described herein, will be continuously operated so as to remove the packaged corn from the machine.

The trays 90 lying to the right (Fig. 2) of the bagging position may now be loaded with cleaned and sorted ears of corn, two ears being placed in each tray. A supply of bags 175 is placed in the magazine 180, the weight 186 being swung rearwardly on the arms 185 for this purpose. After the stack of bags has been placed on the feeding plate 190, the weight 186 is returned to the position shown in Fig. 11, thereby depressing the top bag on the stack to the proper level for seizure by the lower end of tube 214 (Fig. 9).

Figure 4:
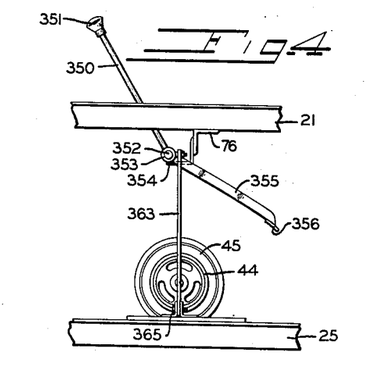
Fig. 4 is a detail view, with parts omitted, showing the clutch operating mechanism in the position it assumes when the clutch is engaged.

The main driving mechanism of the machine is now brought into operation by moving the clutch lever 350 from the position shown in Fig. 1 to that shown in Fig. 4. As previously explained, rotation of the lever 350 rocks the shaft 352 and causes camming surface 359 (Fig. 5) on cam 358 to shift slider 361 to the right thereby pressing in operating button 366 and engaging the friction clutch. Gear reducer 51 (Fig. 3) is thereby operated and output shaft 52 drives shaft 56 through chain 55. As previously explained, this shaft, through bevel gear 68, drives the horizontal shaft to which bevel gear 69 is secured, thereby operating the eccentric arm 102 and the pusher actuating cam 150 (Fig. 7). Shaft 56 also drives shaft 79 through chain 80 thereby rotating cam 273 (Fig. 3). Shaft 79, in turn, drives shaft 84 through chain 85 thereby rotating cam 240 secured to the shaft 84. It will be recalled that eccentric arm 102 operates ratchet wheel 100 by means of link 103, arm 104 and pawl 106 while the pusher actuating cam 150 reciprocates the carriage 134 on which the pusher member 130 is carried. It will also be recalled that cam 240 actuates a roller 239 (Fig. 9) on an arm 238 which is secured to the frame 221 thereby moving the hose 214 from its initial position above the front end of the bag magazine to the position indicated by reference numeral 214' and return. Cam 273, on the other hand, operates roller 272 carried by crosshead 267 to which the lower end of link 265 is attached. The upper end of this link is connected to the arm 264 fast on shaft 260 to which is secured plate 164 on which the bagging tube 160 is pivotally mounted. Accordingly, the trays 90 will be advanced one by one from the loading position to the bagging position where the corn will be ejected from the trays by pusher member 130 into bagging tube 160 which will then be rocked from its horizontal position to a vertical position so as to discharge the corn from the tube and strip from the tube the bag previously placed thereon by the bag threading mechanism.

Figure 14:
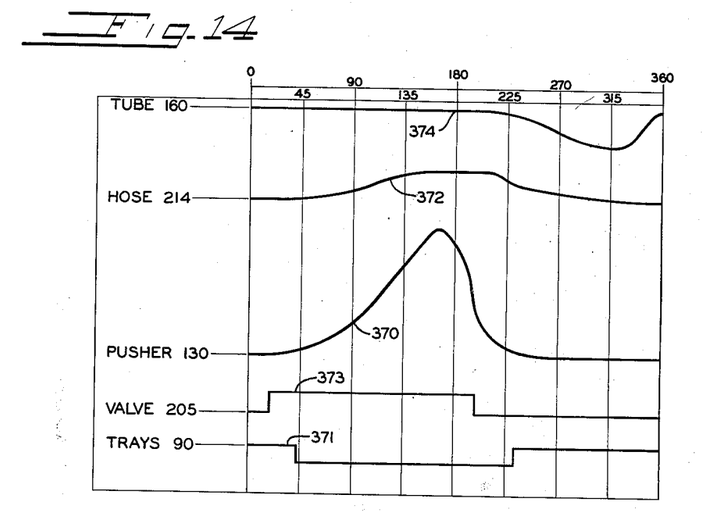
Fig. 14 is a time chart showing the time in the cycle when the various mechanisms operate.

The sequence of operation of the tray advancing mechanism, the ejecting mechanism, the bag threading mechanism and the bag stripping mechanism may best be understood by reference to Fig. 14 of the drawing which shows a time chart illustrating the time in the cycle when each of these mechanisms operates. As illustrated by the time chart, the zero point in the cycle of the main driving mechanism is the point at which the pusher member 130 is ready to commence its movement toward the tray 90 located in the bagging position. As illustrated by the curve 370 (Fig. 14) the pusher member moves into the tray during the first half of the cycle, is then rapidly withdrawn, and remains idle in its retracted position during the remainder of the cycle.

The movement of the trays 90 is illustrated by the line 371 on the time chart, this line indicating that the trays are still advancing at the zero point of the cycle and continue to advance during the first 40° of the cycle. The tray advancing pawl 106 (Fig. 2) then comes to rest and the movement of the trays ceases. The trays remain stationary during the first half of the cycle while the pusher member 130 is ejecting the ears of corn from the tray located in the bagging position. After the pusher member has been retracted from the tray, the pawl 106 again engages a tooth on the ratchet wheel 100 and commences another advancing movement of the trays. As indicated by line 371 on the time chart, the trays remain idle from approximately 40° to 235°.

The movement of the hose 214 from its initial position, in which it lies above the forward edge of the magazine (Fig. 9), to the threading position 214′, and return, is illustrated by the curve 372 in the time chart. As illustrated by this curve, at the zero point in the cycle the hose is at rest in its full line position shown in Fig. 9. At approximately 45°, the hose commences to move along the path 243 toward the pointed end of the bagging tube 160. At approximately the 90° point in the cycle, the hose occupies the dot-and-dash line position indicated by reference numeral 214″ and, by the time the cycle has progressed to 145°, the hose will occupy a position indicated by reference numeral 214′ in Fig. 9. Thus, the bag 175 will have been completely threaded on the bagging tube by the time the pusher member 130 has moved the corn from the tray into the tube.

As illustrated by the line 373 in the time chart, the valve 205 which controls the application of suction to the hose 214 is in its "Off" position at the beginning of the cycle but will be turned "On" by the engagement of the leading edge 251 of curved cam plate 248 (Fig. 12) with the bell crank 206 at an early point in the cycle and before the hose 214 commences to move away from the bag magazine. As soon as the bell crank 206 is rocked by the cam plate 248 so as to turn the valve 205 to its "On" position, suction will be applied to the hose 214 and it will seize the top fold of the uppermost bag in the stack. Hence, when the hose commences to move toward the bagging tube, it will carry the top bag with it. The valve 205 will remain in its "On" position until just after the midpoint of the cycle whereupon the bell crank 206 will be released by cam plate 248 and the connection of hose 214 with vacuum tank 200 will be cut off. Therefore, when the hose 214 commences its return travel from position 214′ to the full line position shown in Fig. 9, it will have released the bag 175 and will permit the bag to remain on the bagging tube.

After the bag has been completely threaded on the tube and the corn has been pushed therein by pusher member 130, the roller 272 (Fig. 12) rides off the high surface of the cam and, as shown by line 374 of the time chart, tube 160 commences to descend under the urgency of spring 274 (Fig. 9). The downward movement of the tube 160 commences after the midpoint of the cycle, reaches the position indicated in Fig. 12 at approximately 315°, and is returned to its initial, horizontal position at the conclusion of the cycle. Accordingly, the corn contained within the tube will be discharged therefrom, thus stripping bag 175 off the tube just before the conclusion of the machine cycle. As the corn leaves the tube 160, it is guided by the curved plate 280 (Fig. 1) into the mouth 284 of the guide chute which causes it to move down between the belts 291 and 292 of the discharge conveyor with the bottom of the bag resting on the belt 290. The belt 290 will move the bag toward the left as viewed in Fig. 3 until it is picked up by the opposing belts 291 and 292 and carried out of the machine.

As the machine continues to operate, an attendant continues to load the trays 90 with the corn to be bagged and the insertion of the corn into the bags and delivery thereof from the machine is carried out at a high rate of speed and without requiring the use of skilled labor for its execution.

When the machine attendant notices that the supply of bags contained in the magazine 180 is becoming depleted, he may stop the machine by moving the clutch control lever to its Fig. 1 position, thereby disengaging the friction clutch 45 and applying the brake shoe 356 to the brake drum 357. After a fresh supply of bags has been placed in the magazine, the machine may be brought back into operation by moving the control lever 350 to its Fig. 4 position, whereupon the clutch will be reengaged and the main driving mechanism operated by gear reducer 51.

While I have described my invention in conjunction with one particular type of structure, it will, of course, be apparent that my invention is not limited to the particular embodiment disclosed herein and that various changes may be made therein without departing from the spirit of the invention.

Having thus described my invention, what I claim as new and useful and desire to secure by United States Letters Patent, is:

1. In a bagging machine, the combination of a plurality of horizontally disposed interconnected trays each adapted to receive as many articles as it is desired to package in a single bag; means for advancing said trays seriatim from a tray loading position where the articles are loaded onto the trays, to a bagging position where the articles are moved from a particular tray into a bag, means for ejecting the articles from each tray as the tray is moved to the bagging position; a horizontally disposed bagging tube supported for rocking movement and located at the bagging position for receiving the articles as they are ejected from the tray; a bag magazine; means for removing a bag from said magazine and threading the same over the end of said tube; and means for rocking said tube to a vertical position after the articles have been moved therein and a bag has been threaded thereon so as to cause the articles to fall from said tube and into said bag thereby stripping the bag from said tube.

2. The combination defined by claim 1 including a main driving mechanism for operating in timed sequence said advancing means, said ejecting means, said removing and threading means, and said rocking means.

3. The combination defined by claim 2 including a continuously running motor; and means for selectively connecting said main driving mechanism with said motor or for disconnecting it therefrom.

4. In a bagging machine, the combination of a compartmented means for holding the articles to be bagged; a horizontally disposed bagging tube supported for rocking movement and adapted to receive interiorly thereof the articles to be bagged and exteriorly thereof the bag for receiving the articles; means for threading a bag over said tube; means for pushing the articles to be bagged from said compartmented means into said tube; and means for rocking said tube to a vertical position after the articles have been placed therein and the bag has been threaded thereon so as to cause the articles to fall from the tube and into the bag thereby stripping the bag from the tube.

5. The combination recited by claim 4 wherein said tube includes a supporting and rotating member mounted for rotation about a horizontal axis, and two semi-conical shells each journaled adjacent its large end on an axle carried by said supporting member and extending perpendicular to the axis of rotation of said supporting member and also perpendicular to the longitudinal axis of said shell; and wherein said rocking means includes a device for rocking said supporting member about its horizontal axis so as to move the longitudinal axes of said shells from a horizontal position to a vertical position.

6. The combination recited by claim 5 including means for resiliently urging said shells into engagement with one another so that a pointed end will be presented by said tube when empty.

7. In a bagging machine, the combination of a compartmented means for holding the articles to be bagged; a horizontally disposed bagging tube supported for rocking movement for receiving the articles to be bagged; means for pushing the articles to be bagged from said compartmented means into said tube; a bag magazine; means for removing a bag from said magazine and threading the same over the end of said tube; and means for rocking said tube to a vertical position after the bag has been threaded thereon so as to cause the articles to fall from said tube and into said bag thereby stripping the bag from said tube.

8. In a bagging machine, the combination of a compartmented means for holding the articles to be bagged; a main driving mechanism; a horizontally disposed bagging tube supported for rocking movement for receiving the articles to be bagged; means for pushing the articles to be bagged from said compartmented means into said tube; a bag magazine; mechanism operable to remove a bag from said magazine and thread the same over the end of said tube; means operable by and in synchronism with said main driving mechanism for operating said removing and threading means; and means operable by and in synchronism with said main driving mechanism for rocking said tube to a vertical position after the bag has been threaded thereon so as to cause the articles to fall from said tube and into said bag thereby stripping the bag from said tube.

9. In a bagging machine, the combination of a bagging tube for receiving the articles to be bagged; a bag magazine for holding a stack of bags; a source of suction; a suction hose for seizing the top bag on the stack; means, including a valve for selectively connecting said source to said hose; reciprocably operable means for moving said hose from said magazine over the end of said tube and back again so as to cause the bag seized by said hose to be threaded over the end of said tube; and means, synchronized with the operation of said reciprocably operable means, for operating said valve to cut off said source of suction from said hose after the latter has been moved over said tube and to again apply suction to said hose after the latter has been returned to its position adjacent said magazine.

10. In a bagging machine having a bagging tube for receiving the articles to be bagged, said tube being pointed at one end, means for rocking said tube from a loading position to a discharging position, and a bag magazine for holding a stack of bags with their open ends facing the pointed end of said tube, the combination of a vacuum tank; a flexible hose; means for connecting one end of said hose with said tank including a cut-off valve; mechanism for guiding the opposite, open end of said hose along a path extending from said bag magazine over the pointed end of said tube while the latter is in its loading position, the path of travel extending in close proximity to the pointed end of the tube; means for actuating said guiding mechanism so as to move the open end of the hose from the bag magazine over the tube and return; and means operating in synchronism with said actuating means for operating said cut-off valve and said rocking means to break the connection between said hose and said vacuum tank and rock said tube from its loading position to its discharging position during the return travel of said hose.

11. The combination defined by claim 10 wherein said actuating means includes one rotatable cam and said operating means includes another rotatable cam; and a main driving mechanism for rotating both of said cams in synchronism.

12. In a bagging machine, the combination of a main driving mechanism; a plurality of horizontally disposed interconnected trays for receiving the articles to be bagged; intermittent drive means operable for said main driving mechanism for advancing said trays step-by-step from a loading position to a bagging position; means, including a pusher member, operated by said main driving mechanism for pushing the articles off each tray as the tray is brought to the bagging position; a horizontally disposed bagging tube supported for rocking movement and located at the bagging position for receiving the articles after they are pushed off a tray; and means operable by said main driving mechanism for rocking said tube from horizontal position to vertical position after the articles have been pushed therein by said pusher member.

13. The bagging machine of claim 1 including a chute for receiving the filled bags from said bagging tube and for guiding them downwardly in an upright position; and a horizontal conveyor beneath said chute for receiving the bags and conveying them out of the machine in an upright position, said conveyor including elements for engaging opposite sides of the bags and holding them upright as they move along the conveyor.

References Cited in the file of this patent

UNITED STATES PATENTS

| Number | Name | Date |
|---|---|---|
| 1,763,738 | Avis | June 17, 1930 |
| 1,830,645 | Dietsch | Nov. 3, 1931 |
| 1,935,269 | Jones | Nov. 14, 1933 |
| 2,076,942 | Gardner | Apr. 13, 1937 |
| 2,133,367 | Wagner | Oct. 18, 1938 |
| 2,285,283 | Jones | June 2, 1942 |
| 2,323,350 | Paynter | July 6, 1943 |
| 2,355,500 | Anderson | Aug. 8, 1944 |
| 2,402,869 | Buchanan et al. | June 25, 1946 |
| 2,540,489 | Pretzer | Feb. 6, 1951 |